United States Patent

Boyer

[15] 3,646,850
[45] Mar. 7, 1972

[54] DETENT MECHANISM FOR BRAKE BOOSTER

[72] Inventor: Peter W. Boyer, South Bend, Ind.
[73] Assignee: The Bendix Corporation
[22] Filed: Mar. 16, 1970
[21] Appl. No.: 19,579

[52] U.S. Cl. ............................................................91/391
[51] Int. Cl. ........................................................F15b 13/10
[58] Field of Search ..........................91/391, 377, 378, 418

[56] References Cited

UNITED STATES PATENTS

| 2,597,418 | 5/1952 | Westbury et al. | 91/391 X |
| 2,766,732 | 10/1956 | Schultz | 91/384 X |
| 2,934,042 | 4/1960 | Stelzer | 91/377 X |
| 2,976,849 | 3/1961 | Stelzer | 91/391 X |

FOREIGN PATENTS OR APPLICATIONS

| 1,105,351 | 3/1968 | Great Britain | 91/391 |

*Primary Examiner*—Edgar W. Geoghegan
*Assistant Examiner*—Irwin C. Cohen
*Attorney*—W. N. Antonis and Plante, Arens, Hartz, Smith and Thompson

[57] ABSTRACT

A hydraulic brake booster is disclosed which includes a housing, a piston slidable in the housing and operatively connected to a master cylinder for actuating the latter, and valve means for admitting pressurized fluid into the housing for shifting the piston. A sleeve is slidably mounted on an operator-operated control rod that is slidably mounted in the housing, ans a pair of levers pivotally interconnect the piston, the sleeve, and the valve mechanism. A releasable coupling device joins the sleeve to the rod for movement therewith when the valve mechanism is functioning normally, but permits the rod to move relative to the sleeve when a malfunction prevents movement of the valve means.

7 Claims, 4 Drawing Figures

PATENTED MAR 7 1972 3,646,850
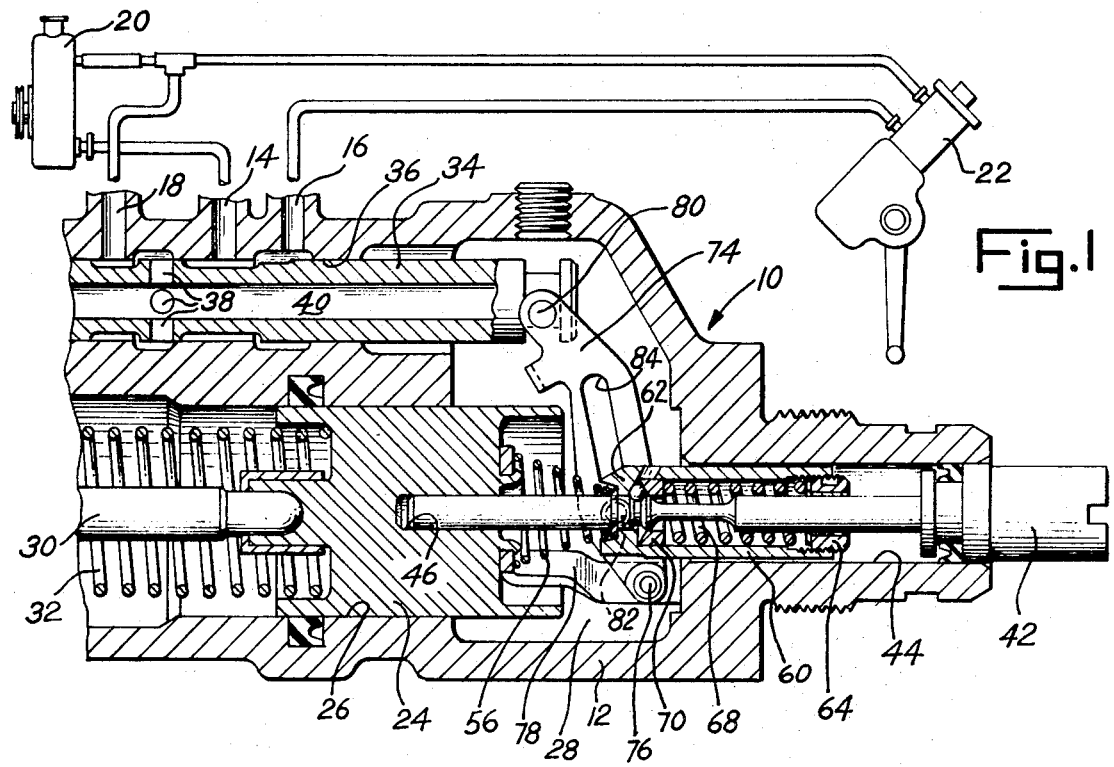
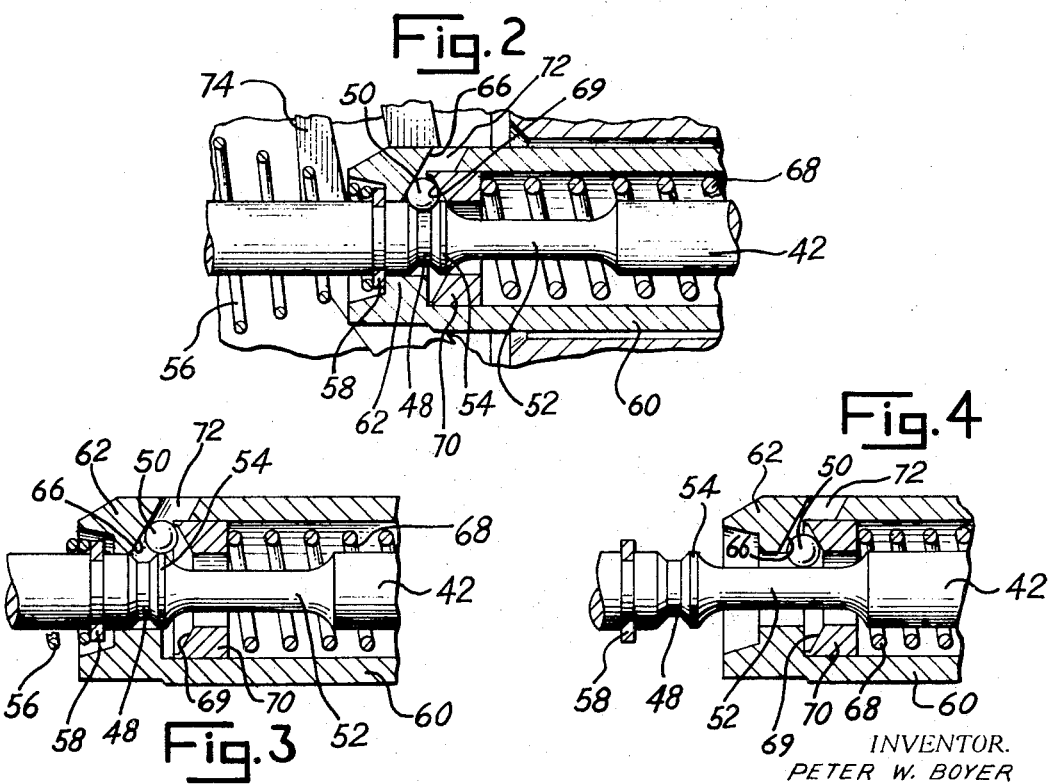
INVENTOR.
PETER W. BOYER
BY
Planté, Arens, Hartz
Smith & Thompson
ATTORNEYS

DETENT MECHANISM FOR BRAKE BOOSTER

BACKGROUND OF THE INVENTION

This invention relates to a hydraulic boost device for use in the brake system of an automotive vehicle.

Because of their smaller size and lower weight, hydraulic brake boosters are expected to be used in lieu of vacuum boosters in vehicles having power assisted brakes in the near future. Such a device is disclosed in U.S. patent application Ser. No. 793,923, filed Jan. 16, 1969, owned by the assignee of the present invention and incorporated herein by reference. This unit utilizes the pressurized fluid produced by the vehicle's power steering pump to provide a hydraulic assist to the vehicle operator when the brakes are applied. The device disclosed in the aforementioned application permits manual actuation of the brakes should the supply of pressurized fluid to the unit be terminated or should a malfunction in the valve mechanism fail to communicate fluid into the unit. After an initial malfunction, the valve sometimes resumes normal operation after the brakes have been partially applied manually. When this occurs, the vehicle stops abruptly, often damaging the vehicle and injuring its passengers.

SUMMARY OF THE INVENTION

Therefore, an important object of my invention is to prevent the valve mechanism from admitting fluid into a brake booster after an initial valve malfunction has initiated manual actuation of the brakes.

Another important object of my invention is to provide coupling means that automatically disconnects the operator-operated control rod from the valve actuating mechanism of the brake booster when a valve malfunction has initiated a manual brake application.

A further object of my invention is to provide a coupling means that automatically disconnects the operator-operated control rod from the valve actuating mechanism when the valve malfunctions, but which automatically recouples the control rod to the valve actuating mechanism when the brakes are released to permit normal operation of the brake booster if the valve mechanism functions normally on future brake actuations.

DESCRIPTION OF THE DRAWINGS

FIG. 1 is a schematic view of a vehicle hydraulic system with a brake booster made pursuant to the teachings of my present invention illustrated in cross section;

FIG. 2 is an enlarged, fragmentary, cross-sectional detail view of the coupling mechanism used in the brake booster illustrated in FIG. 1;

FIG. 3 is an enlarged, fragmentary, cross-sectional detail view, similar to FIG. 2, but illustrating the position of the various elements of the coupling mechanism while the latter is releasing; and FIG. 4 is an enlarged, fragmentary, cross-sectional, detail view, similar to FIGS. 2 and 3, but illustrating the position of the various elements of the coupling mechanism after the latter has released.

DETAILED DESCRIPTION

Referring now to the drawings, a brake booster 10 includes a housing 12 having an inlet port 14, an outlet port 16, and a return or exhaust port 18. The inlet port 14 is communicated with the high pressure side of a power steering pump 20, and the outlet port 16 is communicated with the inlet of a power steering gear 22. The exhaust port 18 is communicated to the low pressure side of the pump 20 as is the outlet port of the power steering gear 22.

A piston 24 is slidable in a longitudinally extending bore 26 within the housing 12. One end of the piston 24 is slidably received in a boost chamber 28 within the housing 12. A rod 30 connects the other end of the piston 24 with a standard master cylinder (not shown) mounted on the left side of the housing 12 viewing FIG. 1. Movement of the piston 24 to the left develops pressure in the master cylinder in the usual manner to apply the vehicle's brakes. A return spring 32 also engages the other end of the piston 24 to return the latter to its normal position after the brakes are released.

A spool valve 34 is slidable in a bore 36 within the housing 12 and is adapted to control fluid communication between the inlet 14, the outlet 16, and the boost chamber 28. In the position illustrated in FIG. 1, the spool valve 34 communicates substantially all of the fluid that flows into the inlet directly to the outlet, and vents the chamber 28 to the low pressure side of the pump 20 through the exhaust port 18. When the vehicle operator depresses the brake pedal, spool valve 34 is shifted to the left viewing FIG. 1, terminating fluid communication between the chamber 28 and the exhaust port 18, and simultaneously directing a portion of the fluid flowing into the inlet 14 through radially extending passages 38 and longitudinally extending passages 40 in the spool valve 34. Details of the construction and operation of the spool valve 34 are described in copending U.S. patent application Ser. No. 13,415, filed Feb. 24, 1970, owned by the assignee of the present invention and incorporated herein by reference.

An operator-operated control rod 42 is slidably mounted in yet another bore 44 within the housing 12. One end of the control rod 42 is secured to the usual brake pedal (not shown) in the vehicle operator's compartment and the other end of the rod 42 is slidably supported in a blind bore 46 formed in the end of the piston 24. A circumferentially extending groove 48 is formed in the rod 42 and is adapted to receive a plurality of force-transmitting elements or spheres 50 spaced circumferentially around the control rod 42. A second groove 52 having a substantially greater axial length than that of the groove 48 is also formed in the rod 42, and is separated from the groove 48 by a ridge 54. A conical spring 56 is disposed between the piston 24 and a snapring 58 on the rod 42 and yieldably biases the control rod 42 toward the right viewing FIG. 1.

A sleeve 60 is slidably mounted on the control rod 42 and has a substantially greater inside diameter than the diameter of the rod 42. A pair of inwardly projecting abutments 62, 64 are provided on opposite ends of the sleeve 60 and slidably engage the control rod 42. The abutment 62 is normally disposed between the snapring 58 and the forward edge of the groove 48 and is provided with a sloping surface 66 that engages one side of the force-transmitting elements or spheres 50. A resilient member 68 is disposed between the other abutment 64 and a washer 70, the outside diameter of which slidably engages the inside diameter of the sleeve 60. The resilient member 68 yieldably biases the sloping forward surface 69 of the washer 70 into engagement with the other side of the spheres 50. Access openings 72 are provided through the sleeve 60 so that the spheres 50 may be placed in the groove 48.

One end of a pair of levers 74 are connected by pivots 76 to a bracket 78 mounted on the piston 24. The other ends of the levers 74 are pivotally connected to the spool valve 34 as at 80. A pin 82 on the sleeve 60 engages slots 84 on the levers 74, providing a pivotal connection between the levers and the sleeve. The levers 74 are disclosed in detail in copending U.S. patent application Ser. No. 35,800, filed May 8, 1970, owned by the assignee of the present invention and incorporated herein by reference.

MODE OF OPERATION

In operation, the spring 68 acting through the washer 70 normally forces the spheres 50 against the sloping face 66 of the abutment 62 and against the forward edge of the groove 48, thereby locking the sleeve 60 to the control rod 42 for movement therewith. When the brakes are applied, the rod 42, and therefore the sleeve 60, are forced to the left viewing FIG. 1. Movement of the sleeve 60, acting through the levers 74, shifts the spool valve 34 to a position admitting fluid into the chamber 28 where it acts against the end of the piston 24 to assist the vehicle operator in applying the vehicle's brakes. When the brakes are released, the springs 32 and 56 return the piston 24, the rod 42, and the spool valve 34 to the brake release position.

Although the brake booster 10 normally performs quite satisfactorily, an occassional malfunction sometimes prevents movement of the spool valve 34, thereby requiring that the brakes be applied manually. If the spool valve 34 suddenly shifts after initiation of a manual brake application, fluid is suddenly admitted to the chamber 28, stopping the vehicle very abruptly, often damaging the vehicle and injuring the occupants. It is, therefore, desirable that the spool valve 34 be kept from moving after a manual brake application is initiated.

When a malfunction prevents movement of the valve 34, the sleeve 60 cannot move, since the sleeve and the valve are connected by the rigid levers 74. When the vehicle operator depresses the brake pedal forcing the rod 42 to the left viewing FIG. 1, the surface 66 on the abutment 62 forces the spheres 50 out of the groove 48 against the bias of the spring 68. Further movement of the rod 42 forces the sphere 50 across the ridge 54, as illustrated in FIG. 3, and into the groove 52, as shown in FIG. 4. Since the groove 52 is slightly deeper than the groove 68, the sphere 50 cannot be wedged between the surfaces 66 and 69 while the sphere is disposed in the groove 52, thereby permitting relative sliding motion between the rod and the sleeve for a distance equal to the axial length of the groove 52. This distance is sufficient to permit the end of the rod 42 to engage the end of the blind bore 46 to establish a mechanical link between the brake pedal and the master cylinder to permit manual actuation of the vehicle's brakes. When the brakes are released, the spring 56 urges the rod 42 to the right viewing FIG. 1. Since the spring constant of the resilient means 68 is greater than that of the spring 56, the washer 70 does not move as the spring 56 forces the control rod 42 toward the brake release position. Therefore, the washer 70 will force the spheres 50 over the ridge 54 and into the groove 48 as the rod 42 is moved to the right viewing the figures. This construction insures that if the malfunction in the spool valve 34 terminates on future brake applications, therefore permitting the spool valve 34 to slide, the rod 42 will be connected to the levers 74 so that the booster 10 will function normally.

I claim:
1. In a hydraulic boost device for a vehicle:
a housing having an inlet, an outlet, a bore communicating the inlet with the outlet, and a chamber in fluid communication with said inlet;
a piston shiftable in said chamber;
valve means shiftable in said bore for controlling fluid communication between the inlet, the outlet, and the chamber; and
operator-operated control means for actuating said valve means;
said control means including a pair of members;
actuating means operably connecting one of said members to the valve means, to permit movement of said one member to shift the valve means from a first position in which said valve means communicates substantially all of the fluid flowing into the inlet to the outlet to a second position in which said valve means communicates at least a portion of the fluid flowing into the inlet to the chamber, the other member being arranged for actuation by the vehicle operator, and releasable coupling means normally connecting said one member with the other member, but automatically permitting relative movement therebetween when a malfunction prevents said valve means from shifting;
said one member including a sleeve slidable on said other member, said actuating means including lever means pivotally connecting the piston, the sleeve, and the valve means;
said other member being a rod having a circumferentially extending groove formed therein;
said coupling means including force transmitting elements in said groove operably connecting said sleeve to the rod for movement therewith when the valve means is functioning normally, but permitting the rod to move relative to the sleeve when a malfunction prevents movement of the valve means.

2. In a hydraulic boost device for a vehicle:
a housing having an inlet, an outlet, a bore communicating the inlet with the outlet, and a chamber in fluid communication with said inlet;
a piston shiftable in said chamber;
valve means shiftable in said bore for controlling fluid communication between the inlet, the outlet, and the chamber; and
operator-operated control means for actuating said valve means;
said control means including a pair of members;
actuating means operably connecting one of said members to the valve means, to permit movement of said one member to shift the valve means from a first position in which said valve means communicate substantially all of the fluid flowing into the inlet to the outlet to a second position in which said valve means communicates at least a portion of the fluid flowing into the inlet to the chamber, the other member being arranged for actuation by the vehicle operator, and releasable coupling means normally connecting said one member with the other member, but automatically permitting relative movement therebetween when a malfunction prevents said valve means from shifting;
said one member including a sleeve slidable on said other member, said actuating means including lever means pivotally connecting the piston, the sleeve, and the valve means;
said other member being a rod having first and second circumferentially extending grooves formed therein presenting a ridge therebetween;
said coupling means including force-transmitting elements, and resilient means maintaining said force-transmitting elements in said first groove and in engagement with said sleeve when the valve means is functioning normally;
said resilient means yielding when a malfunction prevents said valve means from shifting to force the force-transmitting element across said ridge into said second groove.

3. The invention of claim 1:
said second groove having a substantially greater axial length than said first groove;
said force-transmitting elements sliding in said groove to permit relative movement between the rod and the sleeve.

4. The invention of claim 1:
said sleeve having a substantially greater inside diameter than the outside diameter of said rod;
radially inwardly projecting abutment means on said sleeve slidably engaging said rod on one side of said groove when said valve means functions normally;
said abutment means engaging said force-transmitting elements; and
resilient means operably connecting to the other side of said elements;
said abutment means urging said elements across said ridge against the bias of the resilient means when said malfunction prevents said sleeve from moving with the control rod.

5. The invention of claim 4; and
a washer slidably engaging the inside diameter of said sleeve;
one side of said washer engaging said other side of said elements;
said resilient means engaging the other side of said washer.

6. The invention of claim 5; and
spring means yieldably biasing said control rod toward the brake release position;

said resilient means preventing relative axial movement between said elements and said sleeve as said spring means returns said rod to the brake release position after relative movement between the rod and the sleeve during application of the brakes whereby said force-transmitting elements are forced over said ridge into said first groove.

7. In a hydraulic boost device:

a housing having an inlet, an outlet, a bore communicating the inlet and the outlet, and a chamber in fluid communication with said inlet;

a piston shiftable in said chamber;

valve means shiftable in said bore for controlling fluid communication between the inlet, the outlet, and the chamber;

an operator-operated control rod movable in said housing;

a sleeve slidable on said control rod;

lever means pivotally interconnecting the sleeve, the piston and the valve means;

coupling means releasably connecting said sleeve to said rod to permit the rod to shift said valve means to a position communicating fluid from the inlet to the chamber to shift the piston;

said coupling means automatically permitting relative movement between the rod and the sleeve when a malfunction prevents said valve means from moving; and spring means engaging said rod for returning said rod and said sleeve to the brake release position.

* * * * *